United States Patent [11] 3,572,736

| | | | |
|---|---|---|---|
| [72] | Inventors | John R. Lynch, Fishkill; Leonard E. Otten, Poughkeepsie; Herbert Wenskus, Hopewell Junction, N.Y. | |
| [21] | Appl. No. | 834,783 | |
| [22] | Filed | June 19, 1969 | |
| [45] | Patented | Mar. 30, 1971 | |
| [73] | Assignee | International Business Machines Corporation, Armonk, N.Y. | |

[54] VACUUM CHUCK
10 Claims, 3 Drawing Figs.

[52] U.S. Cl. ........................................... 279/3, 269/21, 279/35, 279/106
[51] Int. Cl. .................................................. B23b 31/30
[50] Field of Search .......................................... 279/3, 35, 46, 106; 269/21, 11

[56] References Cited
UNITED STATES PATENTS
1,351,447 1920 Sorensen .................. 279/106UX
3,333,274 1967 Forcier ..................... 269/21UX
3,475,097 1969 Bishop et al. ............. 269/21X

*Primary Examiner*—Andrew R. Juhasz
*Assistant Examiner*—James F. Coan
*Attorneys*—Hanifin and Jancin and William J. Dick ABSTRACT: This patent discloses a vacuum operated chuck for clamping small workpieces such as integrated circuit chips. The chuck includes a housing having hingeably connected jaws, the jaws being biased apart or in the open position as by a biasing hinge. A chamber is located in the jaws and at the lower portion thereof is a workpiece receiver dimensioned for registration with a workpiece. At the upper portion of the housing is window means which is positioned to permit viewing of the receiver and thus the inwardly facing portion of any workpiece held thereby. The chamber is connected through a conduit to a vacuum supply which causes pivotal action of the jaws permitting the receiver to grasp the workpiece when it overlies the workpiece and is in registry therewith.

PATENTED MAR 30 1971 3,572,736

INVENTORS
JOHN R. LYNCH
LEONARD E. OTTEN
HERBERT WENSKUS

BY *William J. Dick*
ATTORNEY

VACUUM CHUCK

SUMMARY OF THE INVENTION

The present invention relates to chucks, and more specifically to a vacuum operated chuck which includes means for visually observing a workpiece held in the chuck.

Clamps and chucks for holding various size workpieces are well known in the art, as are means for aligning the workpiece held thereby. In certain instances the workpiece is extremely small and visual observation and/or alignment of the hidden side of the workpiece is necessary when the workpiece is held by the clamp.

In view of the above it is a principal object of the present invention to provide a vacuum operated chuck for clamping workpieces with means for observing the side of the workpiece facing inwardly relative to the chuck.

Another object of the present invention is to provide a vacuum operated chuck which permits of easy viewing of the workpiece held by the chuck by sighting the workpiece through the chuck.

Other objects and a fuller understanding of the invention may be had by referring to the following specifications and claims taken in conjunction with the accompanying drawing in which:

Figure 1:
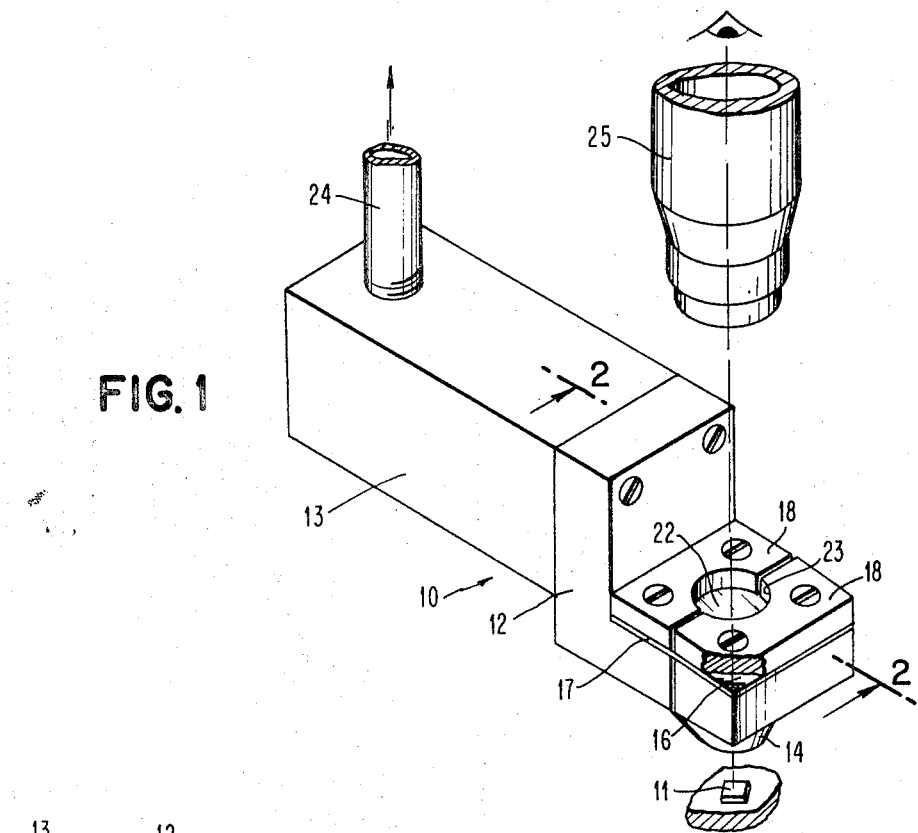
FIG. 1 is a fragmentary perspective view of a vacuum operated chuck constructed in accordance with the invention, and illustrating one way in which the chuck may be used.

Referring now to the drawing and especially FIG. 1 thereof, a vacuum operated chuck 10 for clamping workpieces 11, in the present instance an integrated circuit chip, is illustrated therein.

Figure 2:
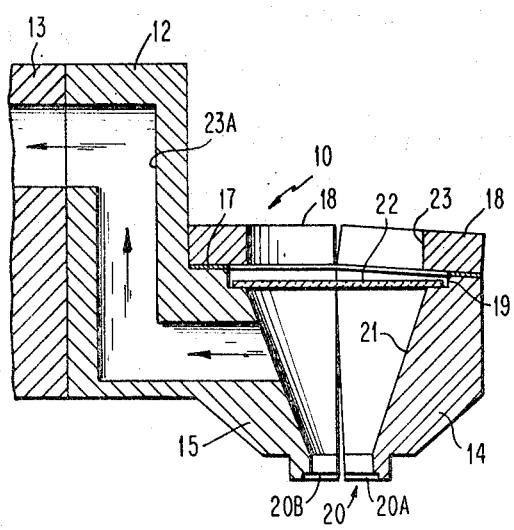
FIG. 2 is an enlarged fragmentary sectional view taken along line 2-2 of FIG. 1.
Figure 3:
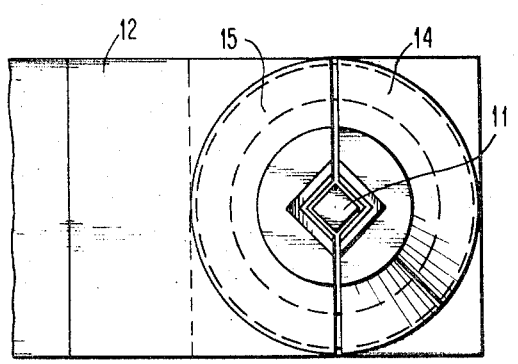
FIG. 3 is a plan view of the apparatus shown in FIG. 2 and as if FIG. 2 were not in section.

In accordance with the invention, the chuck 10 operates to grip or grasp workpieces while permitting visual observation of the upper face or surface of the workpiece when it is held by the chuck as well as allowing proper alignment and orientation of the chuck for registry and gripping of the workpiece 11. To this end, the chuck 10 includes a housing 12 which is connected to a tubular handle and the like 13. AS shown in FIG. 2, the housing 12 is an axially split or separated tube which forms a first and second jaw member 14 and 15 respectively, the jaws being connected together and biased slightly apart as by hinge means 16, in the present instance a flat flexible metal plate 17 which is connected to the first and second jaw members 14 and 15 as by a split hold down plate 18. As shown in FIGS. 2 and 3, at the lower part of the jaw members is workpiece receiving means 20, in the present instance a cavity which is adapted for registration with a workpiece 11 by being dimensioned to grip along the circumference of at least one workpiece. As shown, the receiving means has a first part 20A located on a first jaw member 14 and a second part 20B connected to the second jaw member 15. Interiorly of the jaw members is a conical chamber 21 having downwardly and inwardly sloped walls which merge into the receiving means 20. Overlying chamber 21 and in a recess 19 in the jaw members is window means 22 positioned to permit viewing of the receiving means (and of course a workpiece 11) through an aperture 23 in the hold down plate 18.

The window means 22 may or may not be magnifying and is permitted to float in the recess 19 to prevent breakage of the window upon deflection or pivoting of the first jaw member 14 by the hinge means 16, as hereinafter described.

In order to provide a clamping action and gripping of the workpiece 11 by the receiving means 20, means are provided to apply a vacuum to the chamber 21 to cause the first jaw 14 to pivot about the hinge means 16 causing the receiving means 20 to grasp the workpiece when the receiver overlies the workpiece and registers therewith. To this end and as shown in FIG. 2 the chamber is connected through a conduit 23 to an external tube 24 which is attached to a vacuum pump or the like (not shown).

In use, the vacuum operated chuck 10 is positioned intermediate a magnifying or telescopic eye piece 25 which is aligned with the workpiece or chip 11. The user may align the magnifying eye piece 25 with the workpiece 11 through the window means 22, and when the workpiece is aligned the chuck 10 may be lowered until the receiving means 20 circumscribes the workpiece 11 (see FIG. 3). A vacuum is then applied through tube 24 causing the jaw member 14 to pivot about the hinge means 16 closing the receiver upon the workpiece 11.

We claim:

1. A vacuum operated chuck for clamping workpieces, said chuck comprising:
   first and second hingeably connected jaws, and workpiece receiving means in said jaws;
   biasing means normally separating at least said receiving means;
   window means carried by said jaws; and means to permit viewing of said receiving means through said window means; and
   means for applying a vacuum to said jaws to cause said jaws to close when said receiving means overlies and registers with a workpiece.

2. A vacuum operated chuck in accordance with claim 1 wherein said jaws comprise an axially separable tube, said biasing means including resilient and flexible material connected to said jaws, said biasing means acting as a hinge for said jaws.

3. A vacuum operated chuck in accordance with claim 1 wherein said receiving means includes a first part on said first jaw member and a second part on said second jaw member.

4. A vacuum operated chuck in accordance with claim 3 wherein said workpiece receiving means is dimensioned to grip along the circumference of said workpiece.

5. A vacuum operated chuck in accordance with claim 1 including a changer interiorly of said jaws, a recess in said jaws, overlying said changer, said recess adapted to receive said window means.

6. A vacuum operated chuck in accordance with claim 5 wherein said biasing means includes a flexible resilient sheet-like material overlying said recess and said material having an aperture therein to permit communication with said window means, and hold down means connecting said biasing means to said jaws.

7. A vacuum operated chuck in accordance with claim 6 including a handle connected to at least one of said jaws; and conduit means extending into said handle and in communication with said changer, said receiving means including a first part depending from said first jaw member and a second part depending from said second jaw member, said parts being in fluid communication with said chamber and said conduit means.

8. A vacuum operated chuck for clamping workpieces, said chuck comprising: a housing including a first and a second jaw member, hinge means connecting said jaw members to permit relative movement therebetween and to hold said jaws in a normally open position until actuated; means defining a chamber in said jaw members, and a workpiece receiver in said jaws adapted for registration with a workpiece, said receiver being in communication with said chamber; window means in communication with said chamber and positioned to permit viewing of said receiver and thus a workpiece held thereby; and means to apply a vacuum to said chamber to cause said first jaw to pivot about said hinge means causing said receiver to grasp said workpiece when said receiver overlies the workpiece and registers therewith.

9. A vacuum operated chuck in accordance with claim 8 including a handle connected to said housing, and a conduit connected to said chamber through said handle.

10. A vacuum operated chuck for clamping workpieces, said chuck comprising: an axially separated tube forming first and second jaw members; means defining a workpiece receiver having a first part on said first jaw member and a second part on said second jaw member; said parts being dimensioned for holding a workpiece therebetween; biasing hinge means connecting said first jaw member to said second jaw member, said hinge means biasing said first and second members apart; window means in at least one of said jaw members positioned to permit viewing of said workpiece receiver means and thus a workpiece held thereby; and means to apply a vacuum to said tube to permit said first jaw to pivot about said biasing hinge means causing said receiver to grasp said workpiece.

PO-1050
(5/69)

UNITED STATES PATENT OFFICE
CERTIFICATE OF CORRECTION

Patent No. 3572736          Dated March 30, 1971

Inventor(s) John R. Lynch, Leonard E. Otten, Herbert Wenskus

It is certified that error appears in the above-identified patent and that said Letters Patent are hereby corrected as shown below:

In the claims:

Claim 5, Column 2, line 36 "changer" should be -- chamber -

Claim 5, Column 2, line 37 "changer" should be -- chamber -

Claim 7, Column 2, line 48 "changer" should be -- chamber -

Signed and sealed this 18th day of January 1972.

(SEAL)
Attest:

EDWARD M. FLETCHER, JR.      ROBERT GOTTSCHALK
Attesting Officer             Acting Commissioner of Patents